(12) United States Patent
Asano et al.

(10) Patent No.: US 6,362,786 B1
(45) Date of Patent: Mar. 26, 2002

(54) PATCH ANTENNA UTILIZED IN CONJUNCTION WITH AN ELECTRONIC APPARATUS

(75) Inventors: Takeshi Asano, Atsugi; Akihisa Sakurai, Sagamihara; Arimasa Naitoh, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,534

(22) Filed: Jan. 4, 2000

(30) Foreign Application Priority Data

Feb. 18, 1999 (JP) .......................................... 11-039616

(51) Int. Cl.[7] .................................................. H01Q 1/38
(52) U.S. Cl. ............................... 343/700 MS; 343/702; 343/873
(58) Field of Search .................... 343/700 MS, 702, 343/873, 872; 455/90

(56) References Cited

U.S. PATENT DOCUMENTS

| | | | | |
|---|---|---|---|---|
| 4,835,538 A | * | 5/1989 | McKenna et al. | ... 343/700 MS |
| 5,970,393 A | * | 10/1999 | Khorrami et al. | .............. 455/66 |
| 6,097,339 A | * | 8/2000 | Filipovic et al. | ............ 343/702 |

\* cited by examiner

*Primary Examiner*—Don Wong
*Assistant Examiner*—James Clinger
(74) *Attorney, Agent, or Firm*—Andrew Dillon

(57) ABSTRACT

A patch antenna utilized in conjunction with an electronic apparatus, such as a notebook personal computer, is disclosed. The patch antenna includes a patch, a ground plate, and a dielectric plate. The dielectric plate is formed between the patch and the ground plate. Specifically, the dielectric plate is formed by a wall portion of a chassis of an electronic apparatus located between the patch and the ground plate such that the patch antenna is formed integrally with the chassis of the electronic apparatus.

3 Claims, 3 Drawing Sheets

PATCH ANTENNA UTILIZED IN CONJUNCTION WITH AN ELECTRONIC APPARATUS

BACKGROUND OF THE INVENTION

1. Technical Field

The present invention relates to a patch antenna in general, and in particular to an electronic apparatus employing the patch antenna. Still more particularly, the present invention relates to a patch antenna that can be suitably used in conjunction with an electronic apparatus, such as a notebook personal computer.

2. Description of the Prior Art

Radio communications typically require the assistance of an antenna. Commonly attached to the exterior chassis surface of an electronic apparatus, an antenna transmits and receives radio signals during radio communications. The electronic apparatus can range from a hand-held two-way radio to a notebook personal computer. With the above-mentioned conventional way of attaching an antenna to the electronic apparatus, the antenna most likely protrudes from the exterior chassis surface of the electronic apparatus. As a result, the external appearance of the electronic apparatus is marred. In addition, the antenna itself is also more susceptible to damage.

In view of the above problems, there are several attempts to install the antenna inside the chassis of the electronic apparatus. With such arrangement, however, it is more difficult to obtain a desirable transmission because the antenna is shielded by the chassis and other metal components. Consequently, it would be desirable to provide an improved method of attaching an antenna to an electronic apparatus.

SUMMARY OF THE INVENTION

In accordance with the method and system of the present invention, a patch antenna includes a patch, a ground plate, and a dielectric plate. The dielectric plate is formed between the patch and the ground plate. Specifically, the dielectric plate is formed by a wall portion of a chassis of an electronic apparatus located between the patch and the ground plate such that the patch antenna is formed integrally with the chassis of the electronic apparatus.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
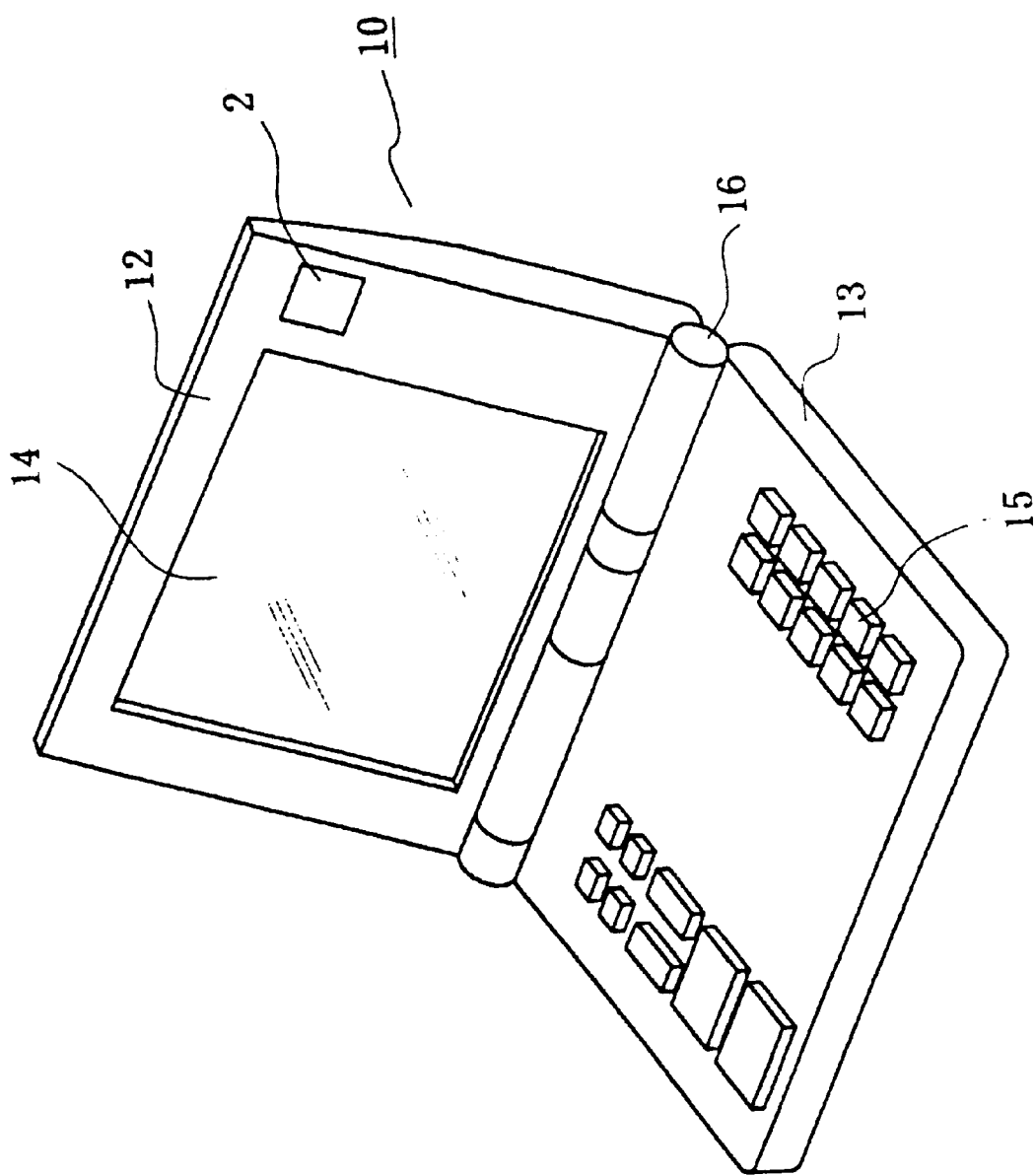
FIG. 1 is a pictorial view of a notebook personal computer in which a preferred embodiment of the present invention is incorporated.

Referring now to the drawings and in particular to FIG. 1, there is illustrated a pictorial view of a notebook personal computer in which a preferred embodiment of the present invention is incorporated. As shown, a notebook personal computer 10 includes a cover 12 and a body 13. Cover 12 is connected to body 13 via a hinge 16 so that cover 12 is pivotally rotatable and closable with respect to body 13. A display screen 14 is provided within cover 12, and a keyboard 15 is provided within body 13. Accordingly, display screen 14 can be pivotally rotatable and closable with respect to keyboard 15.

Figure 2:
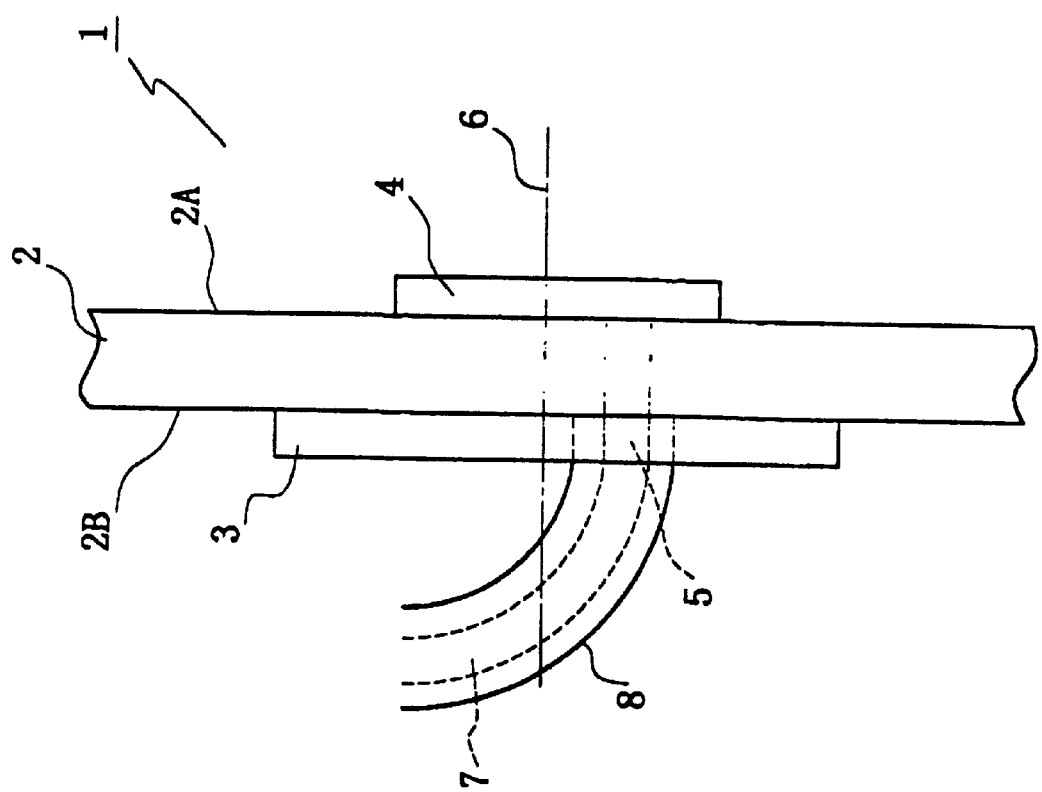
FIG. 2 is a cross-sectional view of a patch antenna in accordance with a preferred embodiment of the present invention.

With reference now to FIG. 2, there is illustrated a cross-sectional view of a patch antenna in accordance with a preferred embodiment of the present invention. A patch antenna 1 includes a dielectric plate formed between a ground plate 3 and a patch 4. As shown, the dielectric plate of patch antenna 1 is formed by a wall portion 2 of a chassis of an electronic apparatus, such as cover 12 of notebook personal computer 10 from FIG. 1. Patch 4 and ground plate 3 are formed on a first surface 2A and a second surface 2B of wall portion 2, respectively. Thus, patch antenna 1 is formed integrally with the chassis of the electronic apparatus.

In this preferred embodiment, ground plate 3 has an opening 5 at a position shifted downward from a sectional center line 6. Opening 5 is connected to a feeder 7 covered by a shield 8. Ground plate 3 is preferably made of a conductive material, such as copper. Ground plate 3 is preferably constructed from a conductive sheet, although ground plate 3 can be formed by plating or any other method that is well-known in the art. Patch 4 is also made of a conductive material, such as copper, in order to transmit and to receive radio waves as an electric signal. Patch 4 can also be constructed from a conductive sheet that is similar to ground plate 3.

Wall portion 2 is preferably made of materials such as ABS, polycarbonate, and polystyrene. These materials provides various properties that a dielectric plate of patch antenna 1 requires. As shown in FIG. 1, the dielectric plate of patch antenna 1 can be formed integrally with wall portion 2 of cover 12, without degrading the transmission characteristics of patch antenna 1 itself.

Opening 5 is located at a position shifted from the center portion of ground plate 3. If opening 5 is not provided, the electric signal of a received radio wave will be concentrated as feedback current, and as a result, a strong electric field tends to occur at that location. This will cause the blockage of non-directivity and high-frequency band of patch antenna 1 itself. Therefore, by providing opening 5 in ground plate 3, as shown in FIG. 1, the balance of the above-mentioned feedback current can be destroyed in order to generate current in a common mode. As such, the non-directivity and high-frequency band of patch antenna 1 can be realized. The balance of the feedback current can be destroyed even more effectively if opening 5 is in a rectangular shape.

With this arrangement, patch antenna 1 is not located within the chassis of the electronic apparatus. Because patch antenna 1 is not shielded by the chassis and/or other metal components, desirable radio transmission characteristics can be obtained.

Figure 3:
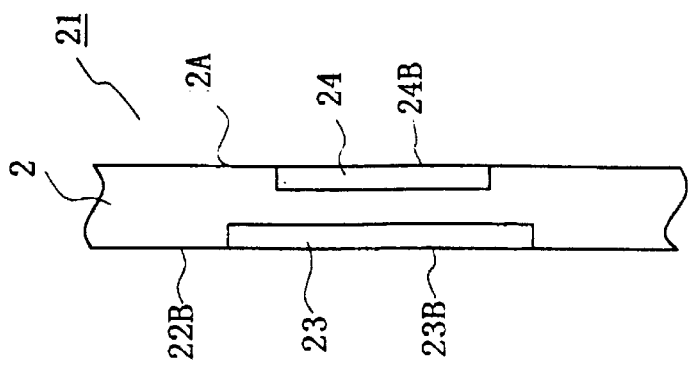
FIG. 3 is a cross-sectional view of a patch antenna in accordance with a second embodiment of the present invention.

Referring now to FIG. 3, there is illustrated a cross-sectional view of a patch antenna in accordance with a second embodiment of the present invention. As shown, a patch 24 and a ground plate 23 of a patch antenna 21 are embedded within wall portion 2 of the chassis, such as cover 12 from FIG. 1. In this embodiment, surface 24B of patch 24 is flush with first surface 2A of wall portion 2, and surface 23B of ground plate 23 is flush with second surface 2B of wall portion 2. With this arrangement, wall portion 2 (specifically the area between patch 24 and ground plate 23) serves as the dielectric plate for patch antenna 21. Similar to patch antenna 1 in FIG. 2, patch antenna 21 is not shielded by the chassis and/or other metal components because patch antenna 21 is not disposed within the chassis; thus, desirable radio transmission characteristics can be obtained. In addition, patch antenna 21 is not protruding from the exterior surface of the chassis.

Figure 4:
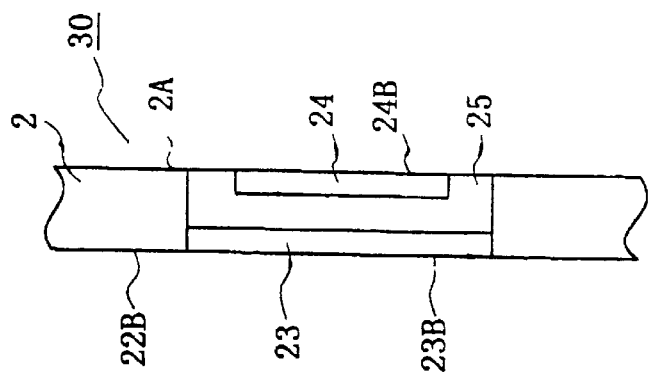
FIG. 4 is a cross-sectional view of a patch antenna in accordance with a third embodiment of the present invention.

With reference now to FIG. 4, there is illustrated a cross-sectional a view of a patch antenna in accordance with a third embodiment of the present invention. As shown, patch 24 and ground plate 23 of a patch antenna 30 are embedded within wall portion 2 of the chassis. In this embodiment, surface 24B of patch 24 is flush with first surface 2A of wall portion 2, and surface 23B of ground plate 23 is flush with second surface 2B of wall portion 2. In addition, a dielectric layer 25 is interposed between patch 24 and ground plate 23. Dielectric layer 25 can have a different dielectric properties from wall portion 2. Dielectric layer 25 may be made of glass epoxy, Teflon, ceramics, etc. With this arrangement, the most suitable dielectric material for the characteristics of patch antenna 30 can be selected independently of the material of wall portion 2 of the chassis.

Figure 5:
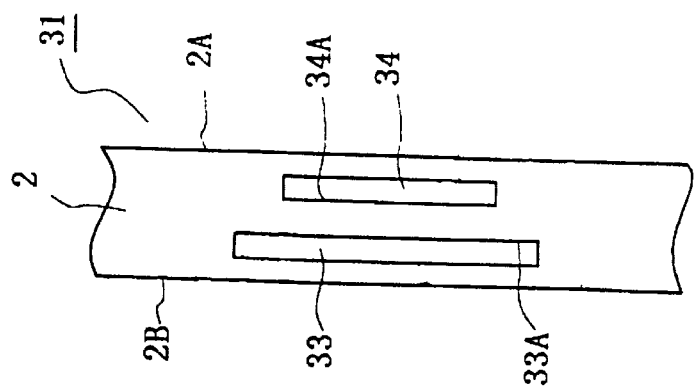
FIG. 5 is a cross-sectional view of a patch antenna in accordance with a fourth embodiment of the present invention.

Referring now to FIG. 5, there is illustrated a cross-sectional view of a patch antenna in accordance with a fourth embodiment of the present invention. As shown, a patch 34 and a ground plate 33 are submerged (or buried) within wall portion 2 of the chassis so that surface 34A of patch 34 and surface 33A of ground plate 33 are parallel with each other. Similar to patch antenna 1 in FIG. 1 and patch antenna 21 in FIG. 3, wall portion 2 (specifically the area between patch 34 and ground plate 33) serves as the dielectric plate for patch antenna 31. With this arrangement, both patch 34 and ground plate 33 are hidden from the surface of the chassis.

As has been described, the present invention provides an improved patch antenna that can be suitably used in conjunction with an electronic apparatus, such as a notebook personal computer. The patch antenna of the present invention can be formed integrally with the electronic apparatus by utilizing an unused space present in the chassis of the electronic apparatus. Therefore, the patch antenna of the present invention will not deface the external appearance of the electronic apparatus like other prior art external antennae that are attached to the exterior surface of the chassis. Furthermore, with the present invention, the antenna and the electronic apparatus are less susceptible to damage.

Although the patch antenna is provided on the upper left side of display screen 14 of cover 12, as shown in FIG. 1, the patch antenna can be placed at any unused space of notebook personal computer 10. For example, the patch antenna can be formed on the upper right side of display screen 14 of cover case 12.

Also, although a notebook personal computer is used to illustrate the present invention, the patch antenna of the present invention can be used in other electronic apparatuses such as printers, facsimiles, and copying machines.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus, comprising:
   a chassis having a top surface, a bottom surface, and an opening extending from said top surface to said bottom surface; and
   a patch antenna positioned inside said opening of said chassis, wherein said patch antenna includes:
   a planar patch having a top surface and a bottom surface;
   a planar ground plate having a top surface and a bottom surface; and
   a dielectric plate having a top surface and a bottom surface, wherein a cavity is formed in said top surface of said dielectric plate, wherein said planar patch is positioned within said cavity of said dielectric plate such that said top surface of said chassis, said top surface of said dielectric plate and said top surface of said planar patch form a planar continuous surface, wherein said bottom surface of said dielectric plate is positioned adjacent to said top surface of said planar ground plane and the extent of said bottom surface of said dielectric plate is the same as the extent of said top surface of said planar ground plane.

2. The electronic apparatus of claim 1, wherein said planar ground plate is a conductive sheet.

3. The electronic apparatus of claim 1, wherein said planar ground plate is formed by plating.

* * * * *